(No Model.)

J. SCHUCH.
MILK SEPARATOR.

No. 585,164. Patented June 22, 1897.

Witnesses.

Inventor.
Joseph Schuch

UNITED STATES PATENT OFFICE.

JOSEPH SCHUCH, OF ROUND GROVE, MINNESOTA.

MILK-SEPARATOR.

SPECIFICATION forming part of Letters Patent No. 585,164, dated June 22, 1897.

Application filed March 24, 1896. Serial No. 584,716. (No model.)

*To all whom it may concern:*

Be it known that I, JOSEPH SCHUCH, a citizen of the United States, residing at Round Grove, in the county of McLeod and State of Minnesota, have invented certain Improvements in Centrifugal Milk-Separators, of which the following is a specification.

My invention relates to that class of centrifugal machines particularly designed for separating full milk into cream and skim-milk. In all machines of this class that I am acquainted with the liquid that the bowl is operating on is either divided by radially-arranged partitions on the wall of the bowl, which prevent the circulation of the milk entirely, or by annular shelves, which lead to the agitation of the liquid in the central portion of the bowl.

The objects of my invention are, first, to provide a means to prevent a too free current of the milk in the bowl without dividing the interior of the bowl into separate compartments; second, to provide a means of adjustment to bring the different points of overflow for the separated liquids when the bowl is in operation to an appropriate level of one kind with the other. I accomplish these results by the mechanism illustrated in the accompanying drawings, in which—

Figure 1:
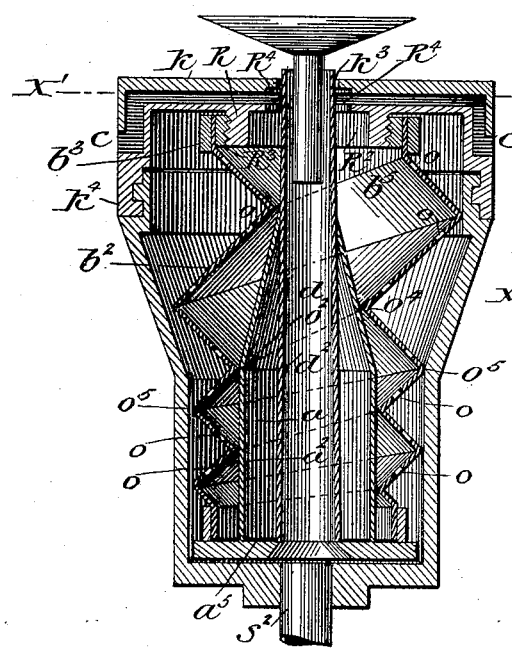
Figure 2:
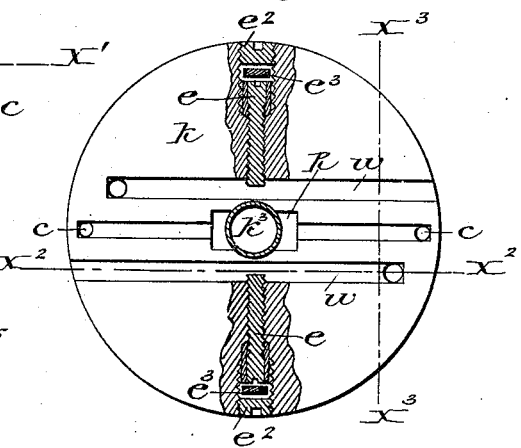
Figure 3:
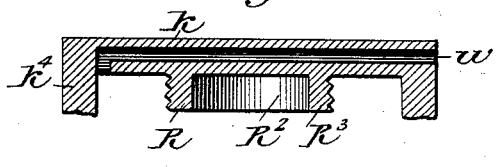
Figure 4:

Figure 1 is a plan of a vertical half of the bowl and its head, the interior removable parts being shown in section. Fig. 2 is a plan of the head on the line of X', Fig. 1, showing the drain-pipes, a part of the cream-chamber, and the overflow-adjustment screws. Fig. 3 is a section of the head on the line of $X^2$, Fig. 2, showing a passage for the discharge of the heavier constituent. Fig. 4 is a section of the head on the line of $X^3$, Fig. 2, showing the discharge-pipes in cross-section.

Similar letters refer to similar parts in all the views.

$b$ is the bowl.

$k$ is the bowl-head.

$a$ is an air-chamber.

$e$ are the overflow-adjustment screws.

$w$ are the milk-pipes.

$c$ are the cream-pipes.

R is an annular projection from the inner surface of the head $k$ downward.

$b^2$ is a hollow screw or jacket.

$b^3$ and $b^4$ are metallic rings of heavier material than the jacket and serve to stiffen the jacket at its upper and lower end.

$s^2$ is the shaft whereby the bowl is rotated.

The jacket $b^2$ is provided with spiral grooves $o^3$ and $o^4$ on its inner and on its outer side. These grooves begin near the upper ring $b^3$, run spirally around the said jacket $b^2$, and terminate near the lower ring $b^4$. The spiral ridges $o^2$ on the inside and $o^5$ on the outside of the jacket $b^2$ project outward to the wall of bowl $b$ and inward to the body of the air-chamber $a$ and the tube $d$. Thus it will be seen that while no blades forming positive stops for the milk are employed it is still compelled to rotate at the full motion of the bowl, as the prominences $o^2$ and $o^5$ come in contact with every part of the length of the bowl $b$, air-chamber $a$, and tube $d$, which, in one sense, has the same effect that radial partitions of the height of the bowl would have, while the spaces formed by the spiral grooves $o^3$ and $o^4$ allow the milk to rise or fall and distribute itself in the bowl according to the laws of gravity.

The cylindrical wall $a^2$, the flat bottom $a^5$ soldered to the lower end of wall $a^2$, the cone-shaped roof $a^4$ soldered to the upper end of cylinder $a^2$, and the tube $d$, passing through the center of roof $a^4$, through the cylinder $a^2$, and bottom $a^5$, and being soldered, confines the air contained between the wall $a^2$, the roof $a^4$, the bottom $a^5$, and the tube $d$, and an annular air-chamber is thereby formed. The object of having this air-chamber will be described hereinafter.

The annular projection R on the lower surface of head $k$ is provided with threads $R^3$, and the jacket $b^2$ screws onto the same by means of the threaded ring $b^5$.

The cream-chamber $R^2$ is formed partly by the projection R on head $k$, and that part of the chamber is annular, and partly by an indentation $R^4$ in the lower side of head $k$, being the shape of a right-angled parallelogram, and the opening $k^3$ for the tube $d$.

Sills $s$ rest on bottom of bowl $b$, are radially arranged and reach out to the wall of bowl $b$, and are soldered to the bottom $a^5$ of the air-chamber $a$. Their functions are, first, to keep the air-chamber in the center of the bowl; second, to support it; third, to facilitate the inflow and distribution of the unseparated article. These sills are further described in my application, Serial No. 562,568, pending herewith.

Pipes $w$ and $c$ are contained in the body of the head $k$, leaving the outer and inner surfaces thereof smooth. Pipes $w$ begin near the periphery of head $k$, pass the axis of the bowl, and discharge at the periphery of head $k$. Pipes $c$ begin in the part $R^4$ of cream-chamber $R^2$, pass to near the periphery of head $k$, then downward in the cylindrical part of head $k$, and out on the outside thereof at a point convenient for receiving the cream.

Two screws $e$ and $e$ pass into the skim-milk pipes $w$ and $w$ at right angles therewith at the point where said pipes $w$ pass the axis of the bowl. As these screws pass into the pipes $w$ from the side farthest off from the axis of the bowl, it will be understood that by screwing both screws $e$ inward the level of the liquid in the bowl is raised and that by screwing them outward the level of the liquid is lowered. In other words, to change these screws from their normal positions is to influence the equilibrium of the different drains and to destroy the usefulness of the bowl for the time being. The orifices $o$ in the jacket $b^2$ admit of the milk and cream to pass through.

Pipes $w$ are rectangular in cross-section, as plainly shown in Fig. 4. The line of their greatest diameter being in line with the line of the top of head $k$ admits of a good range of adjustment by means of screws $e$.

I will now describe the operation of my machine in separating full milk into cream and skim-milk.

The sweet milk is fed into the bowl and guided to the bottom thereof through the tube $d$. It is thence distributed to the wall of the bowl $b$, through the space between the bottom of the air-chamber and the bottom of the bowl, caused by the presence of sills $s$, and will at once flow upward, filling the greatest diameter of the bowl first. The milk in filling the bowl will flow through the orifices in jacket $b^2$ and, having reached the level of the points of overflow, will escape through the openings $w$ and $c$ in head $k$ provided for that purpose. If now the points of overflow, which are the inner ends of the screws $e$ and the inner ends of the pipes $c$, are equally distant from the working axis of the bowl, the overflow will take place through all of these openings in a like quantity. If the overflow is not distributed properly, it may be regulated by means of screws $e$. As it is desirable that the blue milk be subjected to the greatest surface speed just before entering the pipes $w$, preparatory to leaving the bowl, I have given the bowl a greater diameter at its top than at its bottom. It is cylindrically shaped from its bottom up for part of its length and has the shape of an inverted frustum the remainder of its length up to where head $k$ screws onto it.

The air-chamber $a$, being located in the center of the bowl, takes up a large part of the interior of the bowl, crowds the milk away from the center in that part of the bowl, and the overflow will begin with much less milk in the bowl than it could begin if the air-chamber was not contained in the bowl.

Having described my invention and the purpose thereof, what I claim, and desire to secure by Letters Patent, is—

1. The combination, in the bowl of a milk-separator, of an inner device consisting of a horizontal disk $a^5$ perforated in the center; the cylindrical wall $a^2$ the cover $a^4$, and the pipe $d$; the whole soldered together, as described, thus forming an air-tight inclosure, whereby the entering of the milk into the interior of the room $a$ is prevented, substantially as specified.

2. The combination, in the head, $k$, of the bowl, $b$, of a milk-separator, of elastic cushions $e^3$ and removable screw-plugs $e^2$ as a means to secure the adjustment of the screws $e$, substantially as stated.

3. In a milk-separator, the combination of a bowl $b$ of cylindrical form from its bottom upward for a part of its length, then of the shape of an inverted frustum the remainder of its length; provided with a head $k$ with cylindrical wall $k^4$ and a flat top; containing pipes $w$ and $c$; pipes $w$ being straight and terminating on the outside of part $k^4$ of head $k$, pipes $c$ being bent at right angles, passing downward in the part $k^4$ of head $k$, and terminating at the outside thereof.

4. The combination, in a milk-separator, of a bowl $b$ with the head $k$ having an annular projection R threaded for the adjustment of the spirally-grooved jacket $b^2$, and screws $e$ passing into the pipes $w$ from the outside of the head $k$ at right angles with the pipes, on a line with the axis of the bowl; and the screw-plugs $e^2$, and the rubber cushions $e^3$, as stated.

In testimony whereof I affix my name in the presence of two witnesses.

JOSEPH SCHUCH.

Witnesses:
E. A. CAMPBELL,
HENRY KLOSSNER.